(12) United States Patent
Shin (10) Patent No.: US 12,061,681 B2
(45) Date of Patent: Aug. 13, 2024

(54) FINGERPRINT-BASED AUTHENTICATION USING TOUCH INPUTS

(71) Applicant: Google LLC, Mountain View, CA (US)

(72) Inventor: Dongeek Shin, Santa Clara, CA (US)

(73) Assignee: Google LLC, Mountain View, CA (US)

(*) Notice: Subject to any disclaimer, the term of this patent is extended or adjusted under 35 U.S.C. 154(b) by 238 days.

(21) Appl. No.: 17/441,628

(22) PCT Filed: Dec. 7, 2020

(86) PCT No.: PCT/US2020/063623
§ 371 (c)(1),
(2) Date: Sep. 21, 2021

(87) PCT Pub. No.: WO2022/125058
PCT Pub. Date: Jun. 16, 2022

(65) Prior Publication Data
US 2022/0398304 A1    Dec. 15, 2022

(51) Int. Cl.
*G06F 21/32*       (2013.01)
*G06F 3/01*        (2006.01)
(Continued)

(52) U.S. Cl.
CPC .............. *G06F 21/32* (2013.01); *G06F 3/017* (2013.01); *G06V 10/84* (2022.01); *G06V 40/13* (2022.01);
(Continued)

(58) Field of Classification Search
CPC .......... G06F 21/32; G06F 3/017; G06F 3/042; G06V 40/13; G06V 40/1347; G06V 10/84;
(Continued)

(56) References Cited

U.S. PATENT DOCUMENTS 9,697,758 B2    7/2017   Watanabe et al.
9,754,149 B2    9/2017   Apostolos et al.
(Continued)

FOREIGN PATENT DOCUMENTS

CN    111241890    6/2020
CN    111477135    7/2020
(Continued)

OTHER PUBLICATIONS

"Expediting Fingerprint Authentication by Compensation for Display Luminance Latency"—Choi et al, TD Commons, Defensive Publication Series, Oct. 2021 https://www.tdcommons.org/cgi/viewcontent.cgi?article=5779&context=dpubs_series (Year: 2021).*
(Continued)

*Primary Examiner* — Randy A Scott
(74) *Attorney, Agent, or Firm* — Colby Nipper PLLC (57) ABSTRACT

Techniques and apparatuses are described that enable a device to be unlocked and continuous user authentication without a touch input dedicated to fingerprint requisition. A touch input is received that comprises one or more touches to a touchscreen, and raw image data corresponding to the touches is retrieved from a fingerprint imaging sensor. A pixel-clustering technique is performed on the raw image data to determine a portion of the raw image data that corresponds to each of the touches. Touch embeddings are formed for each of the portions of the raw image data and compared to one or more stored fingerprint embeddings that correspond to respective fingerprints of one or more authorized users. An authentication result is then determined for the touch input based on the comparison results.

20 Claims, 5 Drawing Sheets

(51) Int. Cl.
*G06V 10/84* (2022.01)
*G06V 40/12* (2022.01)
*G06V 40/13* (2022.01)

(52) U.S. Cl.
CPC ...... *G06V 40/1347* (2022.01); *G06V 40/1365* (2022.01)

(58) Field of Classification Search
CPC ............ G06K 9/0004; G06K 9/00087; G06K 9/00053; G06K 9/0012
See application file for complete search history.

(56) References Cited

U.S. PATENT DOCUMENTS

| | | | |
|---|---|---|---|
| 10,068,551 | B1 | 9/2018 | Choi et al. |
| 10,410,036 | B2* | 9/2019 | He .................. G06F 3/044 |
| 10,510,317 | B2 | 12/2019 | Spence et al. |
| 11,163,970 | B1 | 11/2021 | Sammoura et al. |
| 11,403,984 | B2 | 8/2022 | Jung et al. |
| 2008/0095413 | A1* | 4/2008 | Yau .................. G06V 40/1359 382/125 |
| 2013/0301832 | A1* | 11/2013 | Harper .................. G06F 21/32 380/243 |
| 2013/0342519 | A1 | 12/2013 | Kim et al. |
| 2015/0287352 | A1 | 10/2015 | Watanabe et al. |
| 2016/0063933 | A1 | 3/2016 | Kobayashi et al. |
| 2016/0078838 | A1 | 3/2016 | Huang et al. |
| 2016/0078846 | A1 | 3/2016 | Liu et al. |
| 2017/0092196 | A1 | 3/2017 | Gupta et al. |
| 2017/0147865 | A1* | 5/2017 | Jensen ............... G06V 40/1329 |
| 2017/0220838 | A1* | 8/2017 | He .................. G06F 3/0412 |
| 2018/0151109 | A1 | 5/2018 | Shim et al. |
| 2018/0301080 | A1 | 10/2018 | Shigeta et al. |
| 2019/0044942 | A1 | 2/2019 | Gordon et al. |
| 2019/0228740 | A1 | 7/2019 | Aflatooni et al. |
| 2020/0273427 | A1 | 8/2020 | Wang |
| 2021/0201731 | A1 | 7/2021 | Ranjan et al. |
| 2021/0408140 | A1 | 12/2021 | Han et al. |
| 2022/0130308 | A1 | 4/2022 | Jung et al. |

FOREIGN PATENT DOCUMENTS

| | | |
|---|---|---|
| CN | 112331145 | 2/2021 |
| CN | 113053306 | 6/2021 |
| KR | 20160080768 | 7/2016 |
| KR | 102279278 | 7/2021 |
| TW | 202032424 | 9/2020 |
| WO | 2022105484 | 5/2022 |

OTHER PUBLICATIONS

"Liveness is Not Enough: Enhancing Fingerprint Authentication with Behavioral Biometrics to Defeat Puppet Attacks"—Wu et al, School of Cyber Science and Engineering, Wuhan University, Aug. 2020 https://dl.acm.org/doi/abs/10.5555/3489212.3489337 (Year: 2020).*
"Foreign Office Action", TW Application No. 110136394, Jul. 18, 2022, 13 pages.
"International Search Report and Written Opinion", PCT Application No. PCT/US2020/063623, Aug. 5, 2021, 8 pages.
Wen, et al., "Improving Under-Display Fingerprint Authentication Latency by Normalizing Frame Luminance", Technical Disclosure Commons—https://www.tdcommons.org/dpubs_series/5006, Mar. 24, 2022, 12 pages.
Choi, et al., "Expediting Fingerprint Authentication by Compensating for Display Luminance Latency", Technical Disclosure Commons, https://www.tdcommons.org/dpubs_series/4686, Oct. 29, 2021, 11 pages.
Choi, et al., "Disabling Transitions When Encoded Intensity is Low", Application No. PCT/US2021/070522, filed May 10, 2021, 46 pages.
Karri, et al., "User Interface Mitigation of Display Artifacts During Transitions between Display Clock Speeds", Technical Disclosure Commons, https://www.tdcommons.org/dpubs_series/5427, Nov. 4, 2022, 7 pages.
Shin, et al., "Dynamic Voltage Scaling of OLED Displays", Jun. 2011, 6 pages.
Yonebayashi, et al., "High refresh rate and low power consumption AMOLED panel using top-gate n-oxide and p-LTPS TFTs", Mar. 2020, 10 pages.
"International Preliminary Report on Patentability", Application No. PCT/US2020/063623, Jun. 13, 2023, 8 pages.

* cited by examiner

FINGERPRINT-BASED AUTHENTICATION USING TOUCH INPUTS

RELATED APPLICATION(S)

This application is a national stage entry of International Application No. PCT/US2020/063623, filed Dec. 7, 2020; the disclosure of which is incorporated herein by reference in its entirety.

BACKGROUND

User authentication is an important tool for ensuring security of sensitive information accessible by computing devices. Fingerprint sensors are often implemented as a quick and effective means of user authentication. More recently, under-display fingerprint sensors have been implemented, which enable fingerprint authentication in a user-friendly and space-efficient manner.

Often times, however, dedicated fingerprint inputs are required to authenticate a user. For example, a device may require that a user place their finger in a certain location or orientation in order to unlock the device. This may detract from a user experience due to the input solely being used to unlock the device. Furthermore, once the device is unlocked, an unauthorized user may use the device unimpeded.

SUMMARY

Techniques and apparatuses are described that enable fingerprint-based authentication using touch inputs. These techniques and apparatuses enable a computing device to be unlocked and a user to be continually authenticated without explicit fingerprint touch inputs. This therefore reduces the number of touch inputs required from a user to unlock the computing device and increases security by allowing continual authentication. For example, a soft-lock screen may be presented (e.g., a blurred user interface or an overlay on top of the user interface) when the device is in a locked state. By simply interacting with the soft-lock user screen (e.g., via a touch input to an element of the user interface), the device may unlock, remove the soft-lock screen or otherwise change to the underlying user interface, perform an action corresponding to the touch input, and let the user continue to interact with the device as they normally would. Once unlocked, touch inputs may periodically be authenticated by the device to ensure that the touch inputs are still from an authorized user. The touch input may be associated with a specific action (e.g., other than being limited specifically to fingerprint recognition) so that the user may be authenticated and input the action in a single touch input.

Aspects described below include a method of fingerprint-based authentication performed by a computing device. The method involves receiving a touch input comprising one or more touches to a touchscreen of the computing device and retrieving, from a fingerprint imaging sensor of the computing device, raw image data corresponding to the touches. The method also involves performing a pixel-clustering technique on the raw image data to determine a portion of the raw image data that corresponds to each of the touches and establishing one or more comparison results for the touch input. The comparison results are established for each of the touches by forming a touch embedding representing the portion of the raw image data corresponding to the respective touch, calculating a similarity between the touch embedding and each of one or more stored fingerprint embeddings that correspond to respective fingerprints of one or more authorized users, and establishing a comparison result for the respective touch based on the calculating. The method then involves determining an authentication result for the touch input based on the comparison results.

Aspects described below also include a computing device comprising a touchscreen, a fingerprint imaging sensor, at least one processor, and at least one computer-readable storage medium comprising instructions that, when executed by the processor, cause the processor to receive a touch input comprising one or more touches to the touchscreen and retrieve, from the fingerprint imaging sensor, raw image data corresponding to the touches. The instructions further cause the processor to perform a pixel-clustering technique on the raw image data to determine a portion of the raw image data that corresponds to each of the touches and establish one or more comparison results for the touch input. The comparison results are established for each of the touches by forming a touch embedding representing the portion of the raw image data corresponding to the respective touch, calculating a similarity between the touch embedding and each of one or more stored fingerprint embeddings that correspond to respective fingerprints of one or more authorized users, and establishing a comparison result for the respective touch based on the calculating. The instructions then cause the processor to determine an authentication result for the touch input based on the comparison results.

BRIEF DESCRIPTION OF THE DRAWINGS

Apparatuses and techniques enabling fingerprint-based authentication using touch inputs are described with reference to the following drawings. The same numbers are used throughout the drawings to reference like features and components.

DETAILED DESCRIPTION

Overview

Under-display fingerprint sensors enable fingerprint-based authentication without dedicated fingerprint input areas (e.g., rear fingerprint sensors or fingerprint sensors on physical buttons). Although under-display fingerprint sensors are more space-efficient and intuitive for a user, they often require dedicated touch inputs for user authentication. As such, a separate step is often needed to interact with a locked device (e.g., step 1: unlock the device, step 2: interact with the device). Furthermore, once a device is unlocked, the device may be unable to continually authenticate the user during interaction with the device (e.g., because typical interactions may not correspond to a location or orientation of a dedicated touch input). This may lead to unauthorized access/use of the device even though it was unlocked by an authorized user.

The methods and apparatuses described herein enable device unlocking and continuous user authentication without dedicated touch inputs for fingerprint requisition. For example, a soft-lock screen may be presented when the device is in a locked state. By simply interacting with the underlying user interface (e.g., via a touch input to a user interface element), the device may unlock and perform a function (e.g., a function associated with the user interface element). Once the device is unlocked, touch inputs may be periodically authenticated as the user interacts with the device. In this way, transitions from a locked state to an unlocked state may be seamless, and a user may be continuously authenticated via normal interaction with the device.

Example Process Flow

Figure 1:
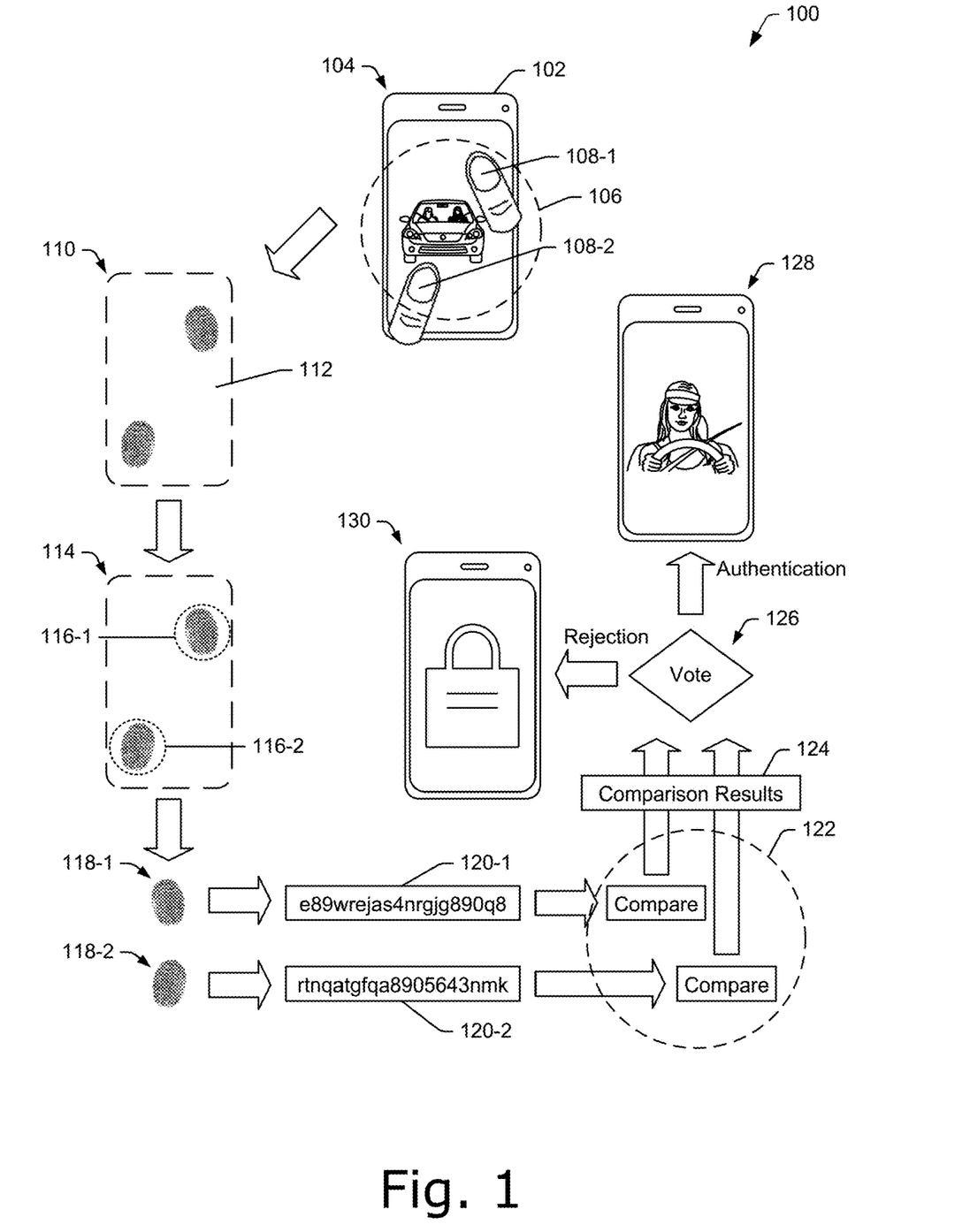
FIG. 1 illustrates an example process flow for fingerprint-based authentication using touch inputs.

FIG. 1 illustrates an example process flow 100 for fingerprint-based authentication using touch inputs. The process flow 100 is generally implemented in a computing device 102 that is discussed further in regard to FIG. 3. The process flow 100 may start, at 104, with the computing device 102 in a locked state or an unlocked state. The process flow 100 is generally the same in either case. As discussed below, however, some details differ depending on the initial condition.

At 104, a user interface is displayed by a touchscreen of the computing device, and a touch input 106 comprising one or more touches 108 is received by the touchscreen. If the computing device 102 is in the locked state, then the touch input 106 may be received to a soft-lock screen (not shown) in conjunction with the user interface, as will be discussed further in regard to FIG. 4. The touch input 106 may comprise a single-touch (e.g., a single-finger tap or drag gesture) or multiple touches (e.g., a multi-finger tap or drag gesture or a multi-finger pinch or spread gesture). In some cases, one or more of the touches 108 may correspond to something other than a finger (e.g., an object, a palm, a knuckle). Alternatively or in addition, the touches 108 may be from two or more users (e.g., the users are both touching the touchscreen). In the illustrated example, the touch input 106 comprises a two-finger spread gesture (e.g., to initiate a zoom) that has touches 108-1 and 108-2.

Based on receiving the touch input 106, at 110, the computing device 102 receives raw image data 112 from an under-display fingerprint sensor of the computing device 102. The raw image data 112 corresponds to the touch input 106.

At 114, a clustering technique is performed on the raw image data 112. The clustering technique clusters pixels of the raw image data 112 into one or more clusters 116 (e.g., clusters 116-1 and 116-2), such that each of the clusters 116 corresponds to one of the touches 108. In the illustrated example, the cluster 116-1 corresponds to the touch 108-1, and the cluster 116-2 corresponds to the touch 108-2.

Portions of the raw image data 118 that correspond to the clusters 116 (e.g., a portion of the raw image data 118-1 and a portion of the raw image data 118-2) are passed individually through a neural network to determine touch embeddings 120 for the respective portions of the raw image data 118 (e.g., a touch embedding 120-1 for the portion of the raw image data 118-1 and a touch embedding 120-2 for the portion of the raw image data 118-2). For example, the neural network may comprise a radial convolutional layer to force rotational invariance (along with other layers as appropriate), and the touch embeddings 120 may comprise hashes of the portions of the raw image data 118.

At 122, the computing device 102 may compare each of the touch embeddings 120 with stored fingerprint embeddings of authorized users to determine if the respective touch embeddings 120 match, or are close enough to, one of the stored fingerprint embeddings (e.g., is within a radius in an embedding space). The stored fingerprint embeddings may have been previously created using a similar neural network.

Results of the comparisons (e.g., comparison results 124) are then voted on at 126. The voting results in an authentication result (e.g., authenticate the touch input 106 as corresponding to one of the authorized users or reject the touch input 106 as not corresponding to one of the authorized users). If the authentication result is an authentication (e.g., yes out of 124), then the computing device 102 may perform an action corresponding to the touch input 106. If the computing device 102 started in the locked state, however, additional actions may be performed (e.g., unlocking the computing device 102 and removing the soft-lock screen). In the illustrated example, the touch input 106 is a spread gesture. Therefore, the user interface may zoom as illustrated at 128. If the authentication result is a rejection (e.g., no out of 124), then the computing device 102 may lock to prevent unauthorized use, as illustrated at 130. The lock may be a soft lock (e.g., still display the user interface) or a hard lock (e.g., replace the user interface with a lock screen).

By performing such actions, transitions from a locked state to an unlocked state may be more seamless, and a user may be continuously authenticated via normal interaction with the device.

Example Data Flow

Figure 2:
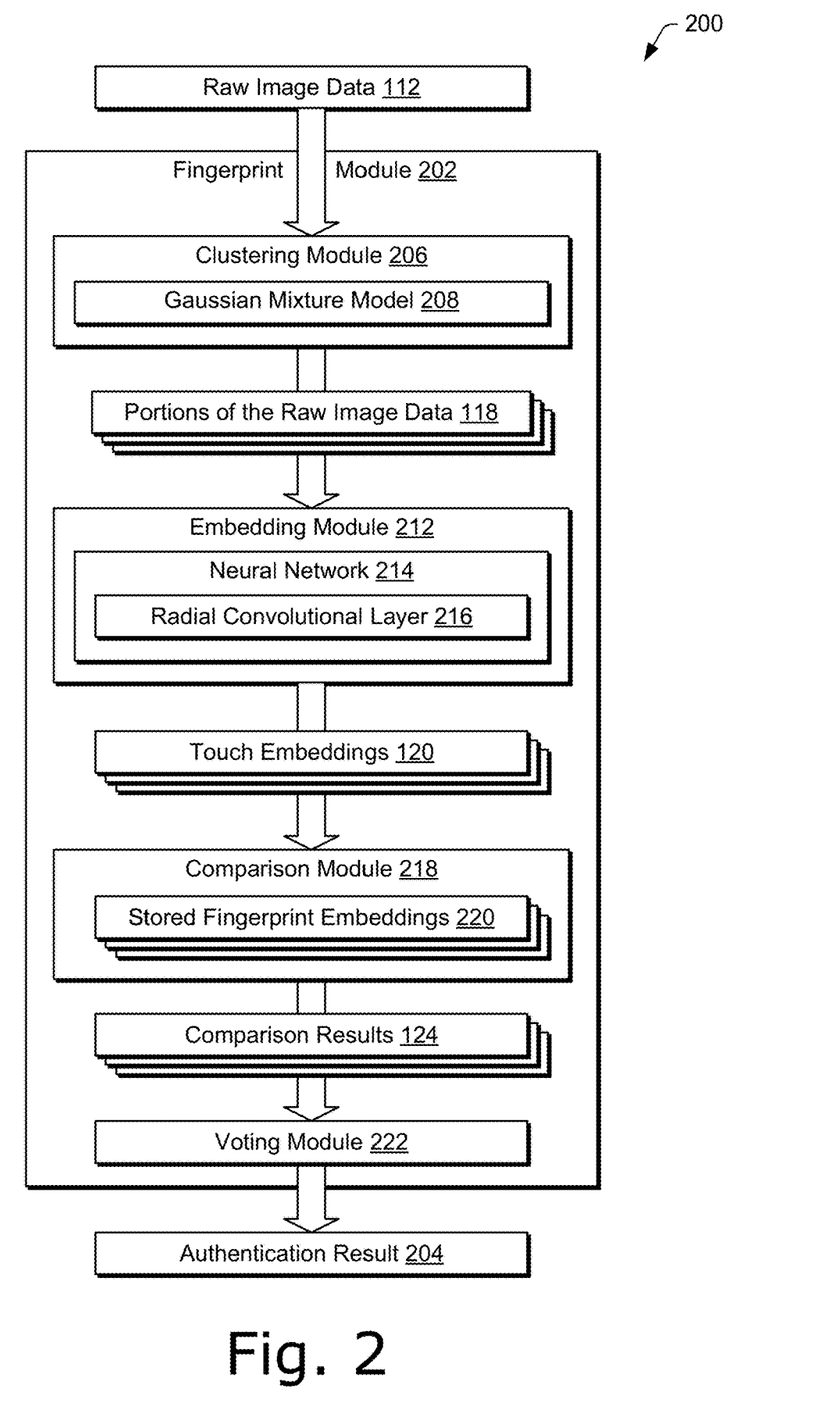
FIG. 2 illustrates an example data flow of a fingerprint module used for fingerprint-based authentication using touch inputs.

FIG. 2 illustrates an example data flow 200 of a fingerprint module 202 used for fingerprint-based authentication using touch inputs. The data flow 200 generally corresponds to at least a portion of the process flow 100 and, thus, may also be implemented in the computing device 102 (not shown) that is discussed below in regard to FIG. 3.

The fingerprint module 202, which is implemented at least partially in hardware of the computing device 102, receives the raw image data 112 corresponding to the touch input 106 and provides an authentication result 204. The raw image data 112 may contain pixel data for an entirety of the under-display fingerprint sensor or for a portion of the under-display fingerprint sensor that corresponds to the touch input 106. For example, the computing device 102 may determine general locations of the touch input 106 (e.g., via capacitive sensors of the touchscreen) and retrieve raw image data corresponding to the locations. In addition, in order to enhance the raw image data 112, the computing device 102 may illuminate the locations (e.g., via pixels or backlights of the touchscreen). The authentication result 204 corresponds to the authentication result out of the voting at 126 of FIG. 1 (e.g., authenticate the touch input 106 as corresponding to an authorized user or reject the touch input 106 as not corresponding to an authorized user). Various actions may be performed based on the authentication result, as will be discussed further below.

The raw image data 112 is received by a clustering module 206 of the fingerprint module 202 that generates the portions of the raw image data 118. In order to do so, the clustering module 206 may use a Gaussian mixture model 208 with a pre-set cluster value to determine the clusters 116 and the corresponding portions of the raw image data 118. The clustering module 206 may determine which pixels of the raw image data 112 have a value above a threshold (e.g., an intensity value, a color value, or a brightness value), determine a number of clusters for the pixels, and assign each of the pixels with the value above the threshold to one of the clusters 116. Accordingly, the clusters 116 are clusters of pixels of the raw image data 112, e.g., portions of the raw image data 118.

The cluster value (e.g., a number of Gaussian clusters) within the Gaussian mixture model 208 may be set to a value that is higher than a number of stored fingerprint embeddings (e.g., if there are four stored fingerprint embeddings, then the number of clusters may be set to ten). The cluster value may also be set to a value corresponding to an expected maximum number of touches in the touch input 106. Since there is very little chance that more than ten fingers or objects would be associated with the touch input 106, a value of ten may be selected for the cluster value. Noted that the cluster value is part of the clustering technique (e.g., the Gaussian mixture model 208) and is used to influence the clustering but does not directly indicate a number of the clusters 116.

Although discussed as utilizing the Gaussian mixture model 208, the clustering module 206 may utilize any clustering techniques known by those of ordinary skill in the art to determine the clusters 116 and corresponding portions of the raw image data 118. Furthermore, the cluster value within the chosen clustering technique may be set according to experimental data (although one of ordinary skill will realize that setting the value above ten may be counterproductive due to a possibility of identifying portions of a touch as separate touches).

Once the Gaussian mixture model 208 (or another model) has determined respective portions of the raw image data 118, the clustering module 206 may provide the portions of the raw image data 118 to an embedding module 212 of the fingerprint module 202. If only one fingerprint is detected, then the clustering module 206 will send a portion of the raw image data 110 that corresponds to the one fingerprint.

The embedding module 212 utilizes a neural network 214 with a radial convolutional layer 216 to determine the touch embeddings 120 of the portions of the raw image data 118 that correspond to the touches 108. The radial convolutional layer 216 allows for rotational invariance of the portions of the raw image data 118. In other words, the radial convolutional layer 216 allows for the associated touch to be in any orientation relative to the device. In this way, the embedding module 212 does not require a specific fingerprint gesture to achieve a usable embedding.

The neural network 214 may contain additional elements that would be known by those of ordinary skill in the art. For example, the neural network 214 may contain a pool (e.g., a max-pool) and fully connected layers (e.g., vanilla layers) to determine the touch embeddings 120. As stated above, the touch embeddings 120 may comprise hashes of the respective portions of the raw image data 118.

The neural network 214 has been trained (e.g., weightings calculated) using known inputs. For example, the neural network 214 may be fed a plurality of instances of fingerprint data of a same finger at different times during normal use of a device (different portions of the fingerprint, different orientations of the fingerprint). The training may be repeated for a plurality of fingers and users to create a reliable network. By training the neural network 214 in such a way, the neural network 214 is able to create a similar embedding regardless of an orientation or portion of an associated touch (e.g., fingerprint). This is similar to facial recognition, where a system may determine an identity of a person even though they may have a portion of their face occluded by glasses or a hat.

Once the touch embeddings 120 have been created, a comparison module 218 compares each of the touch embeddings 120 to stored fingerprint embeddings 220. The stored fingerprint embeddings 220 are embeddings of fingerprints of authorized users that have been previously created using the embedding module 212. For example, during a setup procedure, portions of one or more images corresponding to a fingerprint of an authorized user may be fed into the neural network 214 to create a stored fingerprint embedding for the fingerprint. The process may then be repeated for other fingers and/or other authorized users.

The comparisons may involve checking to see if each of the touch embeddings 120 matches or is close enough to one of the stored fingerprint embeddings 220. For example, the comparison module 218 may determine if each of the touch embeddings 120 is within a certain radius in an embedding space of any of the stored fingerprint embeddings 220. An example comparison using a 1-sparse hit is shown below.

Example Comparison

This example comparison involves inputting one of the touch embeddings 120 through a querying function (e.g., a 1-sparse hit function). The querying function utilizes a forward observation model and backward inference calculations to determine if the touch embedding 120 matches any of the stored fingerprint embeddings 220.

The forward model may be defined as:

$$y = Ax$$

where y is the touch embedding 120 (e.g., vector with a certain size), A is the set of stored fingerprint embeddings 220 (e.g., matrix of the certain size by a number of stored fingerprint embeddings 220), and x is a selection vector (e.g., indicates a match) with a size equal to the number of stored fingerprint embeddings 220.

The backward inference calculations (1-sparse hit) may be defined as:

$$\underset{x \in [0,1]^N}{\text{minimize}} \, \|y - Ax\|_2^2 \text{ s.t. } \|x\|_0 = 1$$

A solution to the optimization problem of the backward inference calculations is essentially a similarity score between the touch embedding 120 and each of the stored fingerprint embeddings 220. The optimization problem may be formulated as a sparse linear inverse system that is solved using the following atom-matching principles:

$$\hat{k} = \underset{k \in \{A_1, A_2, A_3 \ldots A_n\}}{\operatorname{argmax}} A_k^T y$$

$$\hat{a} = A_k^\dagger y = (A_k^T A_k)^{-1} A_k^T y$$

$$f = 1\{\hat{a} > T\}$$

where $\hat{k}$ is an index with a highest similarity score (dot product) between the touch embedding 120 and the respective stored fingerprint embedding 220 ($A_1, A_2, A_3 \ldots A_n$) and f indicates a stored fingerprint embedding 220 as matching if a is greater than a threshold T.

If one of the similarity scores is above the threshold T, then the touch embedding 120, and thus, the touch 108 associated with the touch embedding 120 may be authenticated. If none of the similarity scores are above the threshold T, then the touch embedding 120, and thus, the touch 108 associated with the touch embedding 120 may be rejected. In some embodiments, a distance between the touch embedding 120 and each of the stored fingerprint embeddings 220 may be calculated instead of or in addition to the similarity score.

After the comparisons have been performed, the comparison results 124 are sent to a voting module 222 of the fingerprint module 202 to determine the authentication result 204 for the touch input 106. The comparison results 124 may comprise a set of binary integers corresponding to respective authentications or rejections of the each of the touch embeddings 120. For example, if the touches 108 correspond to an authorized user's finger, the authorized user's palm, and an unauthorized user's finger, respectively, then the set of binary integers would be [1, 0, 0].

The voting module 222 votes on the comparison results 124. The voting may comprise determining if a number or percentage of the authentications or rejections within the comparison results 124 are above a threshold. In the above example, the comparison results 124 are [1, 0, 0], representing a 33% authentication. If the threshold is 20%, then, in this example, the authentication result 204 would be authentication of the touch input 106. If, however, the threshold is 40%, then, in this example, the authentication result 204 would be rejection.

Although the fingerprint module is described as operating on each of the portions of the raw image data 118 in order to determine the authentication result 204, in some embodiments, the portions of the raw image data 118 may be operated sequentially until a comparison result 124 of authentication is determined. For example, the fingerprint module 202 may select one of the portions of the raw image data 118, form a touch embedding 120 for the selected portion, and compare the touch embedding 120 to the stored fingerprint embeddings 220. If one of the comparison results 124 is authentication, then the fingerprint module 202 may determine that the touch input 106 corresponds to an authorized user (e.g., providing the authentication result 204 as authentication) without operating on the other portions of the raw image data 118. If a match is not found, then the fingerprint module 202 may sequentially select others of the portions of the raw image data 118, create associated touch embeddings 120, and compare those touch embeddings 120 to the stored fingerprint embeddings 220 until a comparison result 124 of authentication is determined. If the comparison results 124 do not contain any authentications, then the authentication result 204 would be rejection, e.g., the fingerprint module 202 would reject the touch input 106.

Example Device

Figure 3:
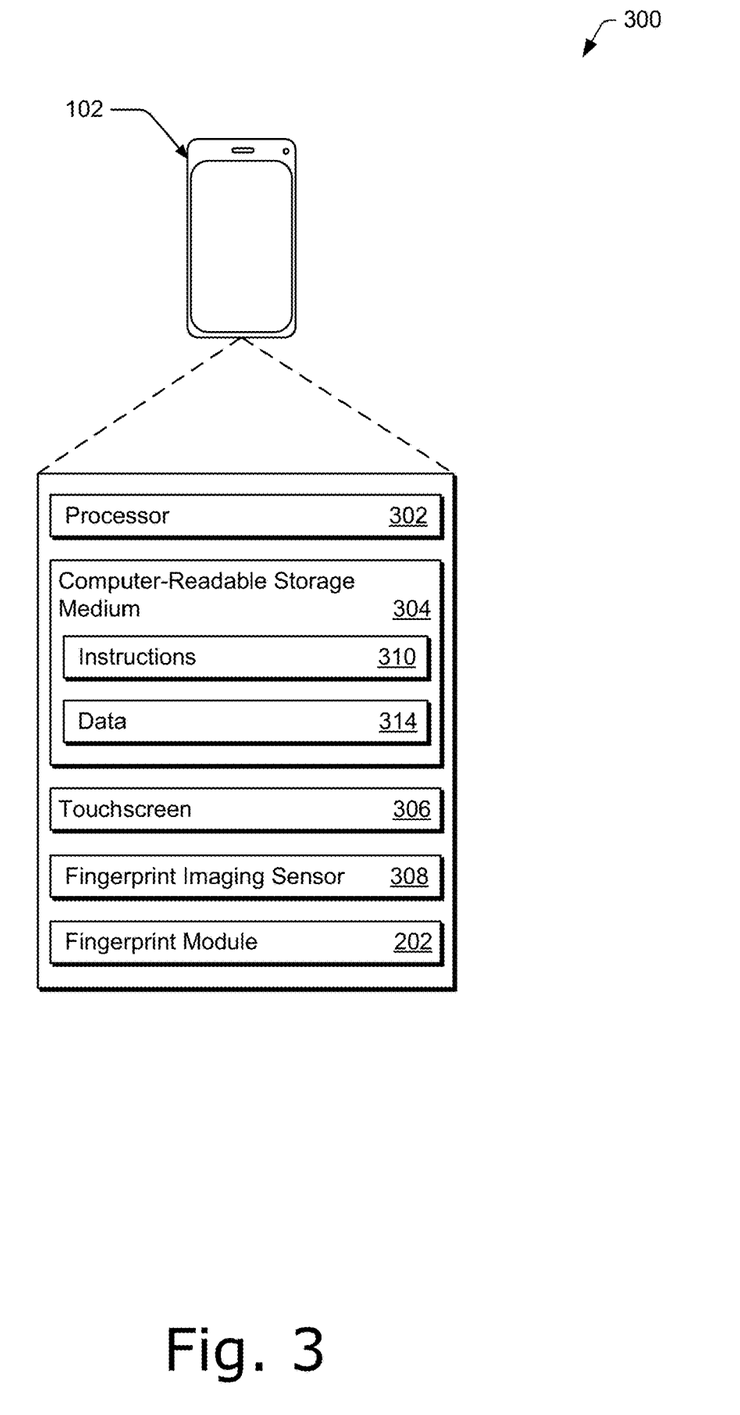
FIG. 3 illustrates an example computing device in which fingerprint-based authentication using touch inputs can be implemented.

FIG. 3 illustrates, at 300, an example of the computing device 102 in which fingerprint-based authentication using touch inputs can be implemented. Although the computing device 102 is illustrated as a smartphone, the computing device 102 may comprise any electronic device (e.g., a laptop, a television, a desktop, a tablet, a wearable device, etc.) without departing from the scope of this disclosure. As shown underneath, the computing device 102 includes at least one processor 302, at least one computer-readable storage medium 304, a touchscreen 306, a fingerprint imaging sensor 308, and the fingerprint module 202.

The processor 302 (e.g., an application processor, microprocessor, digital-signal processor (DSP), or controller) executes instructions 310 (e.g., code) stored within the computer-readable storage medium 304 (e.g., a non-transitory storage devices such as a hard drive, SSD, flash memory, read-only memory (ROM), EPROM, or EEPROM) to cause the computing device 102 to perform the techniques described herein. The instructions 310 may be part of an operating system and/or one or more applications of the computing device 102.

The instructions 310 cause the computing device 102 to act upon (e.g., create, receive, modify, delete, transmit, or display) data 314 (e.g., application data, module data; sensor data, or I/O data). Although shown as being within the computer-readable storage medium 304, portions of the data 314 may be within a random-access memory (RAM) or a cache of the computing device 102 (not shown). Furthermore, the instructions 310 and/or the data 314 may be remote to the computing device 102.

The fingerprint module 202 (or portions thereof) may be comprised by the computer-readable storage medium 304 or be a stand-alone component (e.g., executed in dedicated hardware in communication with the processor 302 and computer-readable storage medium 304). For example, the instructions 310 may cause the processor 302 to implement or otherwise cause the fingerprint module 202 to receive the raw image data 112 and output the authentication result 204, as described in regard to FIGS. 1 and 2.

The touchscreen 306, which provides an indication of the touch input 106, and the fingerprint imaging sensor 308, which provides the raw image data 112, may be any of those known by one of ordinary skill in the art. For example, the touchscreen 306 may be a capacitive touchscreen, and the fingerprint imaging sensor 308 may be a full display fingerprint sensor.

Example Soft-Lock

Figure 4:
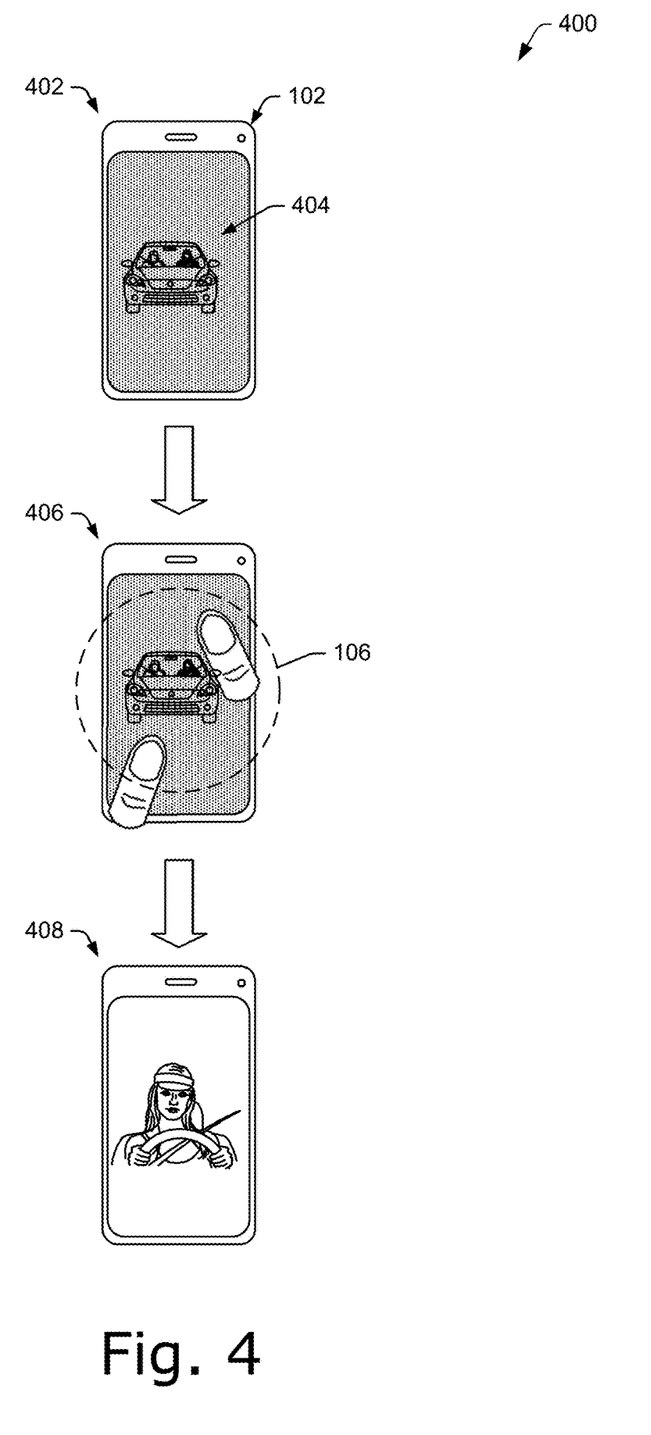
FIG. 4 is an example illustration of fingerprint-based authentication in conjunction with a soft-lock screen.

FIG. 4 is an example illustration 400 of fingerprint-based authentication in conjunction with a soft-lock screen. The example illustration 400 shows the computing device 102 starting, at 402, in a locked state and displaying the soft-lock screen 404 and finishing, at 406, with an action corresponding to the touch input 106.

At 402, the computing device 102 is in the locked state and displaying the soft-lock screen 404. The soft-lock screen 404 may be a blurred user interface, a user interface overlay (e.g., a pattern over the user interface), a color change, or other visual indicator that the computing device 102 is locked while still showing the user interface.

In some implementations, the computing device 102 may display the soft-lock screen 404 in response determining that a user interaction is imminent. For example, if the computing device 102 determines that it has been picked up or that a user is looking at the touchscreen 306, then the device may change from a hard-lock screen to the soft-lock screen with the applicable user interface (e.g., a last used application, home screen, etc.). Step 402 generally precedes the process depicted by FIG. 1 and is an example of what may be displayed when the touch input 106 is received (e.g., at step 104).

The touch input 106 is received at 406, the touch input 106 is authenticated as corresponding to an authorized user (e.g., via the processes of FIGS. 1 and 2), the soft-lock screen 404 removed or changed to the user interface, and an action corresponding to the touch input 106 is performed, as shown at 408. In the illustrated example, the user interface is zoomed according to the touch input 106. In this way, a user may interact with the computing device 102 without a separate unlock step, e.g., progressing from 402 to 408 requires only a single user-input.

Example Method

Figure 5:
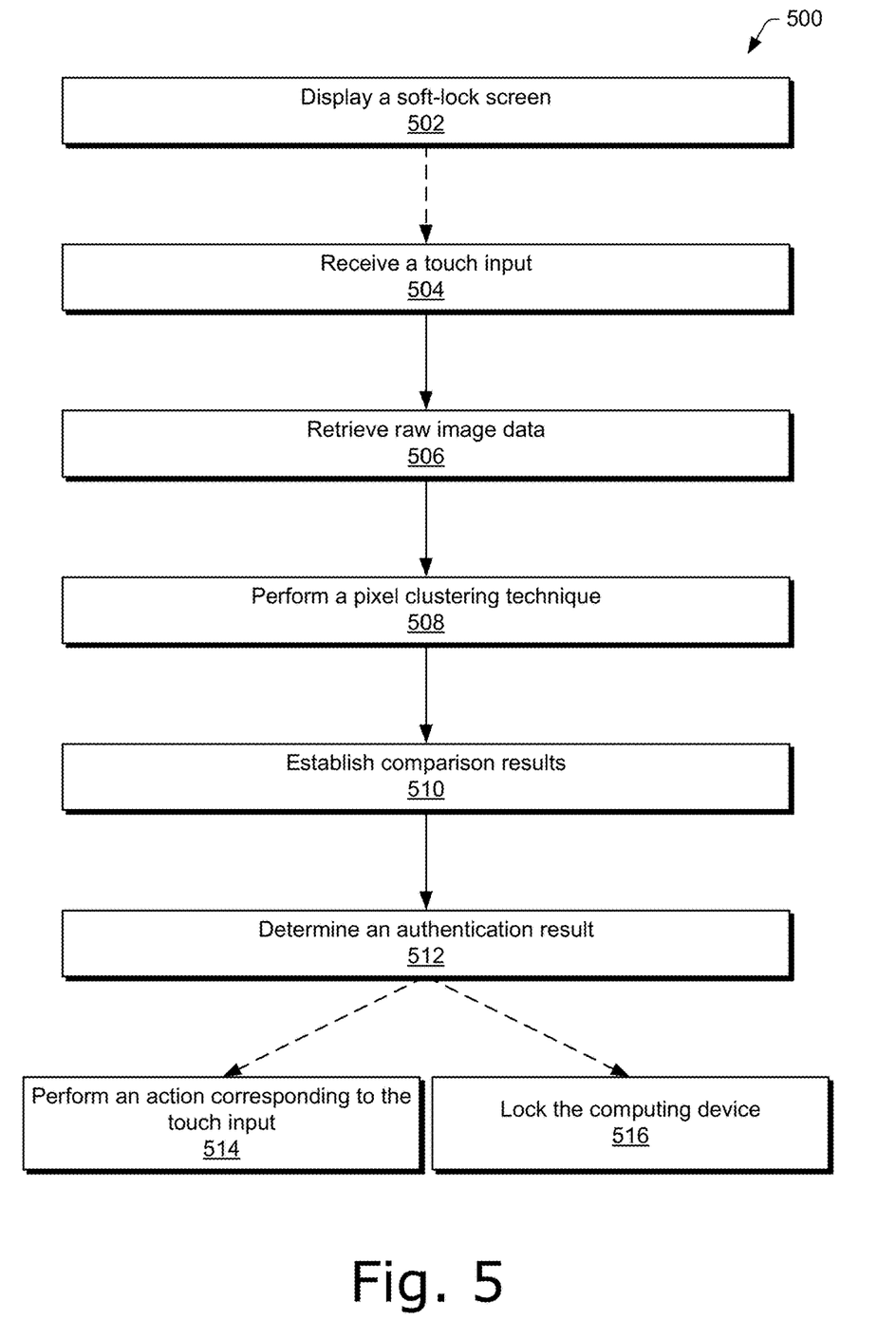
FIG. 5 illustrates an example method for fingerprint-based authentication using touch inputs.

The following discussion describes a method for fingerprint-based authentication using touch inputs. This method can be implemented utilizing the previously described examples, such as the process flow 100, the data flow 200, the computing device 300, and the illustration 400 shown in FIG. 4. Aspects of the method 500 are illustrated in FIG. 5, which is shown as operations 502 through 516 performed by one or more entities (e.g., the computing device 102 and/or the fingerprint module 202). The order in which operations of this method are shown and/or described is not intended to be construed as a limitation, and any number or combination of the described method operations can be combined in any order to implement a method or an alternate method.

Optionally, at 502, a soft-lock screen is displayed. For example, the touchscreen 306 may display the soft-lock screen 404 that may be a blurred version of an underlying user interface screen or an overlay on top of the underlying user interface screen. The soft-lock screen 404 is indicative of the computing device 102 being locked but still directly interactable by an authorized user (e.g., no separate unlock input needed).

At 504, a touch input is received. For example, the touch input 106 may be received by the touchscreen 306, and the touch input 106 may comprise the one or more touches 108. The touch input 106 may be a gesture and may be associated with a function of the computing device 102. Furthermore, the gesture may correspond to a user interface element that is displayed by the computing device 102.

At 506, raw image data corresponding to the touch input is retrieved. For example, the fingerprint module 202 may retrieve or otherwise receive the raw image data 112 that corresponds to the touch input 106.

At 508, a pixel-clustering technique is performed on the raw image data. For example, the clustering module 206 may use the Gaussian mixture model 208 to determine the portions of the raw image data 118 that correspond to the respective touches 108.

At 510, comparison results are established for the touches. The comparison results are established by, for each of the touches, forming a touch embedding representing the portion of the raw image data corresponding to the respective touch, calculating a similarity between the touch embedding and each of one or more stored fingerprint embeddings that correspond to respective fingerprints of one or more authorized users, and establishing a comparison result for the respective touch based on the calculating. For example, the embedding module 212 may use the radial convolutional layer 216 of the neural network 214 to form the touch embeddings 120. The comparison module 218 may compare the touch embeddings 120 to the stored fingerprint embeddings 220 to establish the comparison results 124.

At 512, an authentication result is determined. For example, the voting module 222 may receive the comparison results 124 and determine the authentication result 204. The authentication result 204 may be an authentication of the touch input 106 as corresponding to an authorized user or a rejection of the touch input 106 as not corresponding to an authorized user.

Optionally, at 514, an action is performed responsive to the authentication result indicating that the touch input corresponds to an authorized user. For example, the computing device 102 may determine that the authentication result 204 indicates that the touch input 106 corresponds to an authorized user and perform an action corresponding to the touch input 106 (e.g., the zoom shown at 128 or a selection of a user interface object).

Also optionally, at 516, the computing device is locked responsive to the authentication result indicating that the touch input does not correspond to an authorized user. For example, the computing device 102 may determine that the authentication result 204 indicates that the touch input 106 does not correspond to an authorized user and lock the device (e.g., the soft-lock screen 404 or the lock screen depicted by 130).

EXAMPLES

Example 1: A method of fingerprint-based authentication performed by a computing device, the method comprising: receiving a touch input comprising one or more touches to a touchscreen of the computing device; retrieving, from a fingerprint imaging sensor of the computing device, raw image data corresponding to the one or more touches; performing a pixel-clustering technique on the raw image data to determine one or more portions of the raw image data, each portion of the raw image data corresponding to one of the one or more touches; establishing one or more comparison results for the touch input by, for each of the one or more touches: determining, based on the pixel-clustering technique, the portion of the raw image data that corresponds to the respective touch; forming a touch embedding representing the portion of the raw image data that corresponds to the respective touch; calculating a similarity between the touch embedding for the respective touch and each of one or more stored fingerprint embeddings that correspond to respective fingerprints of one or more authorized users; and establishing a comparison result for the respective touch based on the calculating; and determining an authentication result for the touch input based on the one or more comparison results.

Example 2: The method of example 1, wherein the authentication result for the touch input is further based on a voting of the one or more comparison results, the voting comprising: determining a number of the one or more comparison results that correspond to authentication; and determining if the number of the one or more comparison results that correspond to the authentication surpasses a threshold value.

Example 3: The method of example 1 or 2, wherein the fingerprint imaging sensor comprises a full-display fingerprint imaging sensor.

Example 4: The method of any preceding claim, wherein the touch input comprises a single-touch input.

Example 5: The method of any preceding example, wherein the touch input is a multi-touch input.

Example 6: The method of any preceding example: wherein the touch input is a gesture corresponding to a user interface; wherein the authentication result comprises a determination that the touch input corresponds to an authorized user; and further comprising performing an action corresponding to the gesture.

Example 7: The method of any one of examples 1 to 5: wherein the touch input is a gesture corresponding to a user interface; wherein the authentication result comprises a determination that the touch input does not correspond to an authorized user; and further comprising locking the computing device.

Example 8: The method of any preceding example, further comprising, prior to receiving the raw image data, displaying a soft-lock screen indicating that the computing device has been previously locked.

Example 9: The method of any preceding example, wherein the touch embedding and the one or more stored fingerprint embeddings comprise hashes.

Example 10: The method of any preceding example, wherein the touch embedding and the one or more stored fingerprint embeddings are formed using a radial convolutional layer of a neural network.

Example 11: The method of any preceding example, wherein the calculated similarity corresponds to a radius distance between the touch embedding and the respective stored fingerprint embedding in an embedding space.

Example 12: The method of any preceding example, wherein the pixel-clustering technique comprises a mixture model that determines the one or more portions of the raw image data.

Example 13: The method of example 12, wherein a clustering value within the mixture model that influences the determination of the one or more portions of the raw image data is set to a value less than or equal to ten.

Example 14: The method of example 12 or 13, wherein the mixture model is a Gaussian mixture model that determines the one or more portions of the raw image data.

Example 15: A computing device comprising: a touchscreen; a fingerprint imaging sensor; at least one processor; and at least one computer-readable storage medium comprising instructions that, when executed by the at least one processor, cause the processor to perform the method of any preceding example.

Example 16: A computer-readable storage medium containing instructions that, when executed by one or more processors, cause the one or more processors to perform the method of any one of examples 1-14. The computer-readable storage medium of this example may be a transitory or a non-transitory computer-readable storage medium.

Although implementations of fingerprint-based authentication using touch inputs have been described in language specific to certain features and/or methods, the subject of the appended claims is not necessarily limited to the specific features or methods described. Rather, the specific features and methods are disclosed as example implementations for fingerprint-based authentication using touch inputs. Further, although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples.

What is claimed is:

1. A method of fingerprint-based authentication performed by a computing device, the method comprising:
   receiving a touch input comprising one or more touches to a touchscreen of the computing device;
   retrieving, from a fingerprint imaging sensor of the computing device, raw image data corresponding to the one or more touches;
   performing a pixel-clustering technique on the raw image data to determine one or more portions of the raw image data, the pixel-clustering technique comprising a clustering of pixels of the raw image data into one or more clusters, a respective cluster of the one or more clusters corresponding to a respective portion of the raw image data of the one or more portions of the raw image data, a respective portion of the raw image data of the one or more portions of the raw image data corresponding to a respective touch of the one or more touches;
   establishing one or more comparison results for the touch input by, for each of the one or more touches:
      determining, using the pixel-clustering technique that clusters pixels of the raw image data into one or more clusters of which the respective cluster of the one or more clusters corresponds to the respective portion of the raw image data, the respective portion of the raw image data that corresponds to the respective touch;
      forming a touch embedding representing the portion of the raw image data that corresponds to the respective touch;
      calculating a similarity between the touch embedding for the respective touch and each of one or more stored fingerprint embeddings that correspond to respective fingerprints of one or more authorized users; and
      establishing one or more comparison results for the respective touch based on the calculating; and
   in response to the establishing of the one or more comparison results:
      authenticating the touch input as corresponding to at least one respective fingerprint of a respective authorized user of the one or more authorized users; or
      rejecting the touch input as not corresponding to respective fingerprints of one or more authorized users.

2. The method of claim 1, wherein the authenticating or rejecting further based on a voting of the one or more comparison results, the voting comprising:
   determining a number of the one or more comparison results that correspond to authentication; and
   determining if the number of the one or more comparison results that correspond to the authentication surpasses a threshold value.

3. The method of claim 1, wherein the fingerprint imaging sensor comprises a full-display fingerprint imaging sensor.

4. The method of claim 1, wherein the touch input comprises a single-touch input.

5. The method of claim 1, wherein the touch input is a multi-touch input.

6. The method of claim 1:
   wherein the touch input is a gesture corresponding to a user interface;
   wherein the touch input corresponds to the at least one respective fingerprint of the respective authorized user; and
   further comprising performing an action corresponding to the gesture.

7. The method of claim 1:
   wherein the touch input is a gesture corresponding to a user interface;
   wherein the touch input does not correspond to the respective fingerprints of the one or more authorized users; and
   further comprising locking the computing device.

8. The method of claim 1, further comprising, prior to receiving the raw image data, displaying a soft-lock screen indicating that the computing device has been previously locked.

9. The method of claim 1, wherein the touch embedding and the one or more stored fingerprint embeddings comprise hashes.

10. The method of claim 1, wherein the touch embedding and the one or more stored fingerprint embeddings are formed using a radial convolutional layer of a neural network.

11. The method of claim 1, wherein the calculated similarity corresponds to a radius distance between the touch embedding and the respective stored fingerprint embedding in an embedding space.

12. The method of claim 1, wherein the pixel-clustering technique comprises a mixture model that determines the one or more portions of the raw image data.

13. The method of claim 12, wherein a clustering value within the mixture model that influences the determination of the one or more portions of the raw image data is set to a value less than or equal to ten.

14. The method of claim 12, wherein the mixture model is a Gaussian mixture model that determines the one or more portions of the raw image data.

15. A computing device comprising:
a touchscreen;
a fingerprint imaging sensor;
at least one processor; and
at least one computer-readable storage medium comprising instructions that, when executed by the at least one processor, cause the at least one processor to:
receive, from the touchscreen, an indication of a touch input comprising one or more touches to a touchscreen of the computing device;
   retrieve, from the fingerprint imaging sensor, raw image data corresponding to the one or more touches;
   perform a pixel-clustering technique on the raw image data to determine one or more portions of the raw image data, the pixel-clustering technique comprising a clustering of pixels of the raw image data into one or more clusters, a respective cluster of the one or more clusters corresponding to a respective portion of the raw image data of the one or more portions of the raw image data, a respective portion of the raw image data of the one or more portions of the raw image data corresponding to a respective touch of the one or more touches;
establish one or more comparison results for the touch input by, for each of the one or more touches:
   determining, using the pixel-clustering technique that clusters pixels of the raw image data into one or more clusters of which the respective cluster of the one or more clusters corresponds to the respective portion of the raw image data, the respective portion of the raw image data that corresponds to the respective touch;
   forming a touch embedding representing the portion of the raw image data that corresponds to the respective touch;
   calculating a similarity between the touch embedding for the respective touch and each of one or more stored fingerprint embeddings that correspond to respective fingerprints of one or more authorized users; and
   establishing one or more comparison results for the respective touch based on the calculating; and
in response to the establishing of the one or more comparison results:
   authenticate the touch input as corresponding to at least one respective fingerprint of a respective authorized user of the one or more authorized users; or
   reject the touch input as not corresponding to respective fingerprints of one or more authorized users.

16. The computing device of claim 15, wherein:
the touch input is a gesture corresponding to a user interface; and
the instructions further cause the at least one processor to:
   responsive to the touch input corresponding to the at least one respective fingerprint of the respective authorized user, perform an action corresponding to the gesture; or
   responsive to the touch input not corresponding to the respective fingerprints of one or more authorized users, lock the device.

17. The computing device of claim 15, wherein the touch input comprises a plurality of touches.

18. The computing device of claim 15, wherein the pixel-clustering technique comprises a Gaussian mixture model that determines the one or more portions of the raw image data.

19. The computing device of claim 15, wherein the touch embedding and the one or more stored fingerprint embeddings comprise hashes.

20. The computing device of claim 19, wherein the calculated similarity corresponds to a radius distance between the touch embedding and the respective stored fingerprint embedding in an embedding space.

* * * * *